United States Patent [19]
Augustine

[11] 3,833,906
[45] Sept. 3, 1974

[54] DOPPLER RADAR FOR LAND VEHICLES

[75] Inventor: Carroll F. Augustine, Farmington, Mich.

[73] Assignee: Midwest Microwave, Inc., Ann Arbor, Mich.

[22] Filed: Feb. 14, 1972

[21] Appl. No.: 226,107

[52] U.S. Cl................ 343/9, 343/8, 343/753, 343/784
[51] Int. Cl................................. G01s 9/44
[58] Field of Search......... 343/8, 9, 7 ED, 753, 783, 343/784

[56] References Cited
UNITED STATES PATENTS

| | | | |
|---|---|---|---|
| 2,435,804 | 2/1948 | Spooner | 343/784 |
| 2,801,412 | 7/1957 | Maybury et al. | 343/753 |
| 2,982,956 | 5/1961 | Meyer | 343/8 |
| 3,095,562 | 6/1963 | Dworetzky et al. | 343/8 |
| 3,102,263 | 8/1963 | Meyer | 343/8 |
| 3,118,139 | 1/1964 | Durstewitz | 343/8 |
| 3,137,538 | 6/1964 | Handschin | 343/8 |
| 3,277,430 | 10/1966 | Hagemann et al. | 343/8 |
| 3,371,341 | 2/1968 | Stavis | 343/9 |
| 3,480,954 | 11/1969 | Gray et al. | 343/9 |
| 3,618,084 | 11/1971 | Balsiger et al. | 343/8 |
| 3,659,293 | 4/1972 | Gupta | 343/8 |
| 3,701,568 | 10/1972 | Lewis et al. | 343/8 |
| 3,710,385 | 1/1973 | Howard et al. | 343/8 |
| 3,732,566 | 5/1973 | Schubring | 343/8 |
| 3,750,171 | 7/1973 | Faris | 343/9 |

OTHER PUBLICATIONS

Doppler Navigation, Clegg & Thorne, "Proceedings of The Institution of Electrical Engineers," Vol. 105, Part B, Suppl. No. 9, pp. 235-247, May 1958.

Primary Examiner—Maynard R. Wilbur
Assistant Examiner—H. A. Birmiel
Attorney, Agent, or Firm—Harness, Dickey & Pierce

[57] ABSTRACT

A doppler radar system for automobiles and the like which is especially adapted for measuring speed of the vehicle. Preferably, two radar antennas are utilized, one of which is forwardly and downardly directed and the other of which is rearwardly and downwardly directed. The doppler signals from each of the antennas are summed to provide a velocity signal which is compensated for changes in the pitch of the vehicle. Each of the antennas includes a horn and a dielectric lens for the horn for focusing the transmitted energy at the traveling surface.

12 Claims, 6 Drawing Figures

PATENTED SEP 3 1974 3,833,906
SHEET 1 OF 2
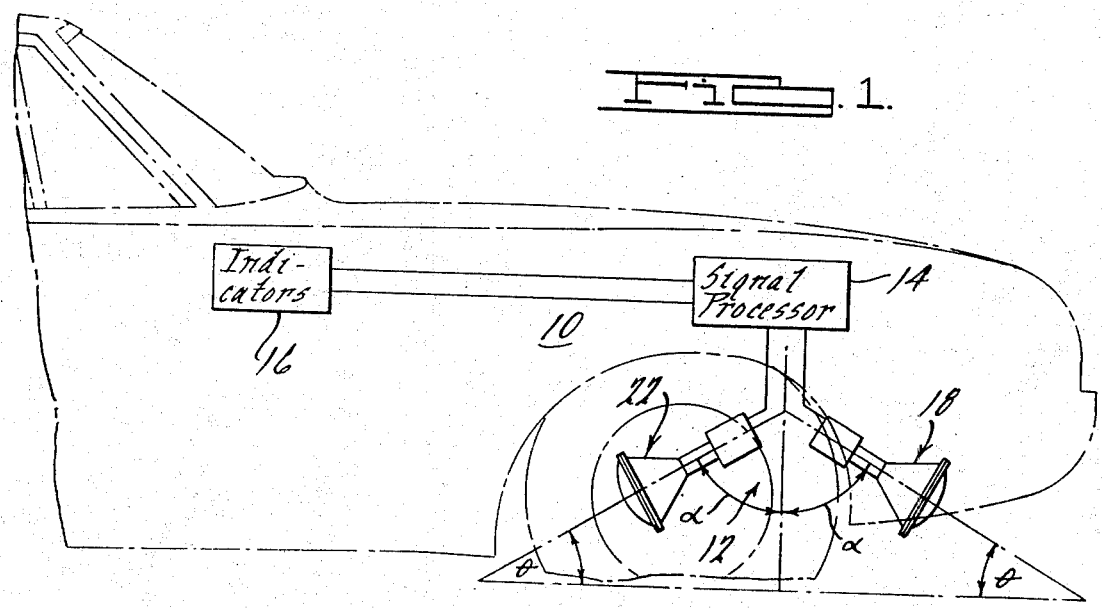
FIG. 1.
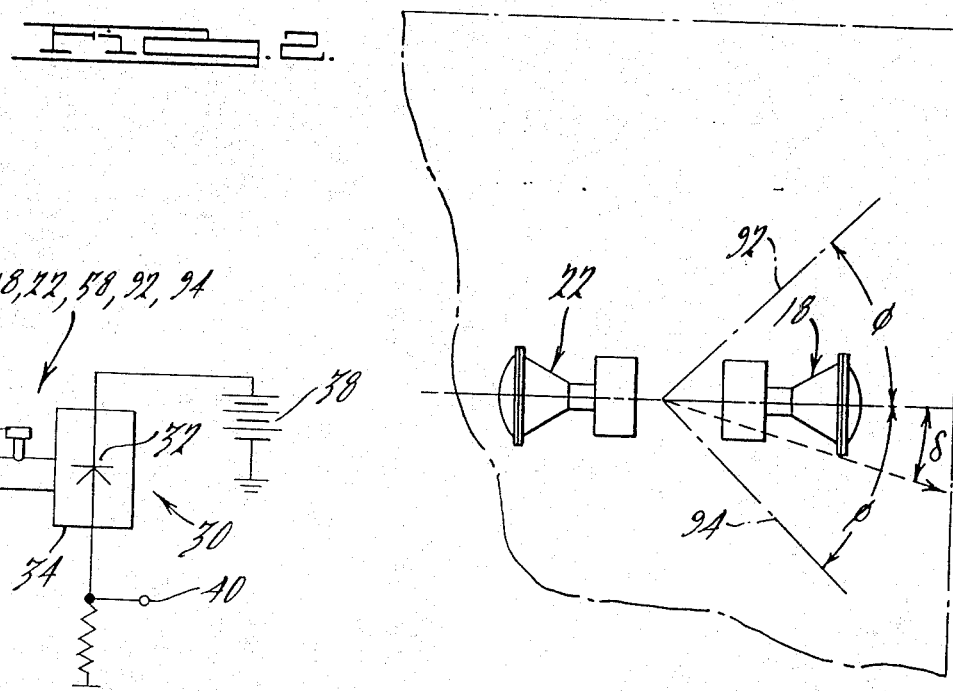
FIG. 2.
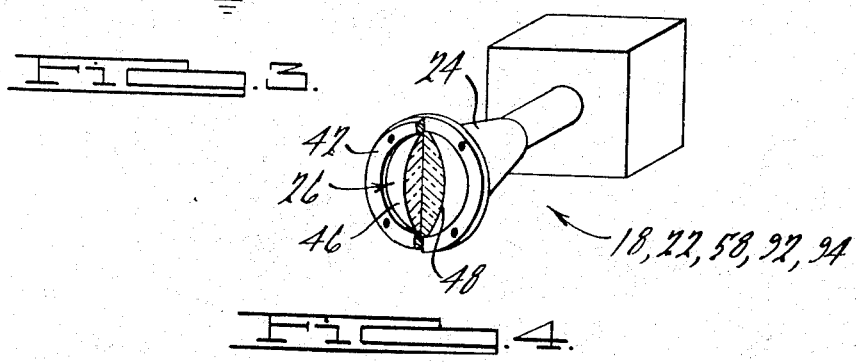
FIG. 3.
FIG. 4.

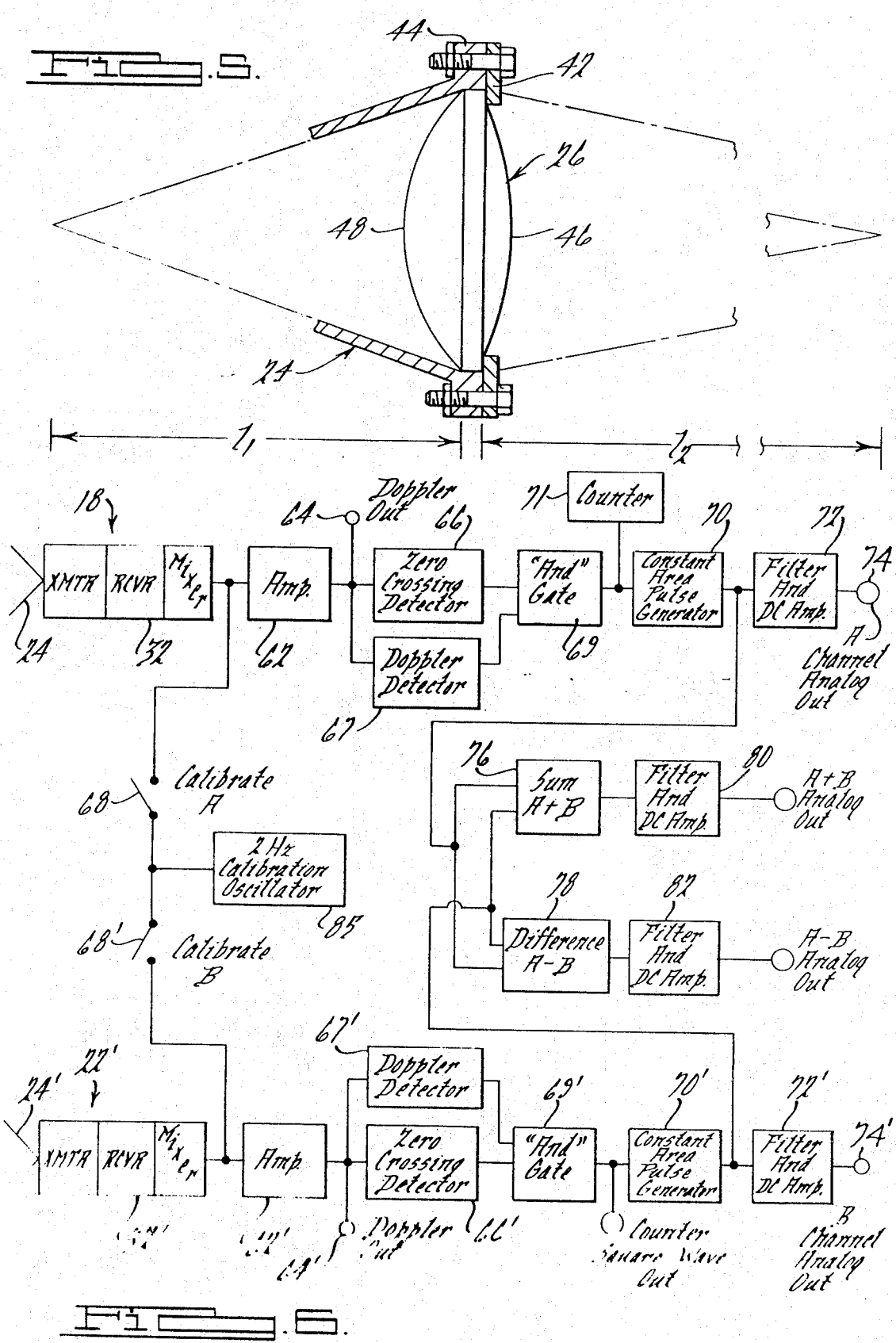

DOPPLER RADAR FOR LAND VEHICLES

BACKGROUND AND SUMMARY OF THE INVENTION

The present invention relates to improvements in velocity sensing doppler radar systems for land vehicles. In an exemplary system according to the present invention, a pair of receiving/transmitting antennas are used, one of which is forwardly and downwardly directed along the longitudinal axis of the vehicle and the other of which is rearwardly and downwardly directed along the longitudinal axis of the vehicle. The downward inclination of each of the antennas is established so that equal angles are formed with the traveling surface when the longitudinal axis of the vehicle is parallel to the traveling surface. Each antenna is associated with a microwave source for generating microwave energy and a mixer which mixes generated energy with energy reflected from a traveling surface for providing a signal representative of the doppler frequency consequent movement of the vehicle along the traveling surface. Preferably, a single diode is used to generate microwave energy for transmission from the antenna and to mix received energy to provide a signal representative of the doppler effect. The signals from each antenna are summed so as to automatically compensate for changes in pitch attitude of the vehicle. If desired, a pair of antennas may be laterally divergently directed with respect to the longitudinal axis of the vehicle to indicate vehicle drift.

Each antenna is focused at the road surface for improving the quality of the doppler signal. Preferably, each antenna is focused using a dielectric lens of high impact-resistance plastic material which provides a sturdy enclosing face for the antenna structure.

BRIEF DESCRIPTION OF THE DRAWINGS

FIG. 1 is a side view of a vehicle mounted radar system having a forwardly directed antenna and an aftwardly directed antenna;

FIG. 2 is a top view of part of the system of FIG. 1 further illustrating the forwardly and aftwardly directed antennas;

FIG. 3 is a partially schematic illustration of a single diode doppler radar sub-system for use in the system of FIG. 1;

FIG. 4 is a first illustration of an antenna structure having a lens system for use in the system of FIG. 1;

FIG. 5 is an illustration of an antenna structure of the present invention, particularly illustrating the focusing lens;

FIG. 6 is a block diagram of the processing circuit of a doppler radar system for a vehicle which provides a velocity output signal and distance traveled output signal; and

DETAILED DESCRIPTION OF THE PREFERRED EMBODIMENTS

In FIGS. 1 and 2, an exemplary embodiment of a land vehicle doppler radar system 10 is illustrated for measuring vehicle speed and distance traveled. The system 10 includes an antenna system 12, a signal processing module 14, and a velocity and distance-traveled indicating unit 16. The antenna system 12 includes a forwardly directed antenna unit 18 and an aftwardly directed antenna unit 22 with each antenna unit being disposed along a longitudinal axis of the vehicle, for example, the central axis of the vehicle. As can be best seen in FIG. 1, the axes of transmission/reception of each the forwardly looking antenna unit 18 and the aftwardly looking antenna unit 22 is directed at an angle $\alpha$ with respect to a vertical axis of the vehicle. Consequently, when the longitudinal axis of the vehicle is parallel to the traveling surface, a complementary angle $\theta$ exists between the axis of transmission/reception of each antenna unit 18 and 22 and the traveling surface.

In FIG. 3, a basic doppler antenna unit 18 or 22 is seen to comprise a horn structure 24 having a lens 26, a tuning stub 28, and microwave generating/receiving/mixing circuit 30. Each of the microwave generating/receiving/mixing circuits 30 preferably has a single diode 32 which is connected to a source 38 of potential which is adjusted so that the diode 32 oscillates in the microwave range. The diode 32 is located in a resonant cavity 34 for establishing the basic frequency of resonance. The resonant cavity 34 has a window or opening connecting the horn structure 24 to the cavity 34 so that at least a portion of the microwave energy within the cavity 34 is delivered to the horn structure 24 to be radiated from the horn 24. It will also be appreciated that various forms of microwave generating and mixing structures can be used including a single generating source for both antennas, or a separate source and separate mixer for each antenna.

The horn 24 is directed at a suitable traveling surface as shown in FIGS. 1 and 2. In this regard, a suitable surface is one having sufficient surface irregularities or projections so that a portion of the radiated microwave energy will be reflected to the horn antenna and delivered to the cavity 34 which is sufficient to affect one or more operating conditions of the diode 32 in accordance with a doppler shift in the received microwave energy caused by relative motion between the antenna unit 18 or 22 and the traveling surface. The types of diodes performing the above generating/receiving/mixing operation are known in this art, one of which being described in the patent to Stephens, Jr., U.S. Pat. No. 3,383,682, issued May 14, 1968. The diode may be a tunnel diode as described in the above patent, a gun diode, an avalanche diode, or other suitable solid state structure.

By way of illustration, the variation in the operating characteristic of the diode 32 which is indicative of the doppler frequency may be a variation in current through the diode at the doppler frequency which is detectable at a terminal 40 which is connected between the diode 32 and a resistor 41 which is in turn connected to ground.

In FIGS. 4 and 5, the form of the horn 24 and the lens 26 can be best seen. The horn 24 is a frustoconical structure with a circular dielectric lens structure 26 mounted at the enlarged end opening thereof by flanges 42 and 44 which are held in sealing, clamping engagement with the lens 26 by suitable bolts as shown. The lens 26 is either a unitary structure or an assembled structure of a first focusing lens portion 46 and a second focusing lens portion 48. The lens portions 46 and 48 are constructed of a non-hydroscopic plastic material of high impact strength such as of a polystyrene known as "Rexolite." It can be seen that the lens structure 26 protects the internal components of the antenna unit 18 or 22 from damage due to flying objects, and additionally, the sealing engagement between the lens structure 26 and the horn 24 weatherproofs the antenna unit 18 or 22. The lens portion 46 has a focal length L2 which is substantially equal to the distance between the lens and the road surface so that the microwave energy transmitted through the lens 26 is focused on the roadway. The lens 48 has a focal length L1 which is substantially equal to the distance between the lens 26 and the microwave source/receiver/mixing structure comprising the diode 32 and the cavity 34. Consequently, microwave energy emitted from the limited location of the source/receiver/mixer structure is colimated and focused at the lens so as to be concentrated into a restricted area at the traveling surface at the intersection of the axis of transmission/reception of the horn. In practice, the area of microwave illumination on the roadway is elliptical with the major axis being longitudinally aligned.

In FIG. 6, a block diagram of the system 10 is illustrated. The antenna unit 18 is illustrated as having an antenna horn 24 and a transmitting/receiving/mixing diode 32 as previously described. The output of the diode 32, which is representative of the doppler frequency resulting from movement of the vehicle, is supplied to an amplifier 62 of processing channel "A." If desired, the doppler signal output from the amplifier 62 may be directly read at a terminal 64 provided for that purpose. The input of the amplifier 62 is also connected to a calibration switch 68 which is ordinarily in the open position as shown in FIG. 6. The switch 68 is adapted to close to connect the input of the amplifier 62 to a 2 kilohertz calibration oscillator 85. The output of the amplifier 62 is delivered to a zero-crossing detector 66 and a doppler detector 67. The zero-crossing detector 66 converts the irregular alternating polarity wave from the amplifier 62 to a square wave having pulses which are initiated upon the predetermined polarity change, i.e., positive to negative or negative to positive, of the signal from the amplifier 62, and which are terminated upon the opposite polarity change. The doppler detector 67 is responsive to the amplitude of the output signals from the amplifier 62 so as to provide a doppler detector signal when the amplitude of the output signal from the amplifier 62 is significantly great so as to indicate a true doppler effect sensed at the antenna 24. In this regard, the doppler detector 67 is not responsive to spurious signals and varying phase shifts of low amplitude due to vertical motions of the automobile caused by the power plant vibrations. The outputs from the zero-crossing detector 66 and the doppler detector 67 are delivered to an AND gate 69 which provides a pulse correlative to each pulse from the zero-crossing detector so long as the doppler detector indicates that a signal of doppler amplitude is present. The pulses from the AND gate 69 are received and counted by a digital counter 71 to yield an odometer reading indicating the distance traveled by the vehicle. The pulses from the AND gate 69 are also delivered to a constant area pulse generator 70 which generates pulses of constant width and height which correspond in number and occurrence to the square wave pulses from the zero-crossing detector 66. The constant area pulse generator output may optionally be delivered to a low pass filter and DC amplifier 72 which effectively integrates the pulses to provide a signal at terminal 74 representative of the rate or frequency of occurrence of the pulses which is in turn representative of the doppler frequency. It will be appreciated that the doppler frequency at terminal 74 is representative only of the doppler signal at the forwardly directed antenna unit 18.

The rearwardly directed antenna unit 22 is seen to comprise a horn 24' and a transmitting/receiving/mixing diode 32' as previously described. A channel "B" for the doppler signal received at the rearwardly directed antenna unit is provided with a calibration switch 68', connected to the calibration oscillator 85, an amplifier 62', a doppler output terminal 64', a zero-crossing detector 66', a doppler detector 67', and AND gate 69', a constant area pulse generator 70', a low frequency filter and DC amplifier 72' and an analogue output terminal 74', all having a function like the correspondingly numbered components of channel "A."

The output of the constant area pulse generator 70 for the forwardly directed antenna unit is delivered to one input terminal of a summing amplifier 76 and one input terminal of a differencing amplifier 78. The output of the constant area pulse generator 70' for the rearwardly directed antenna unit is delivered to the other input terminal of the summing amplifier 76 and the other input terminal of the differencing amplifier 78. The output of the summing amplifier 76 includes the amplitude and width content of the pulses from both the constant area pulse generators 70 and 70' while the output from the differencing amplifier 78 represents the difference in amplitude and width content of the pulses from both the constant area pulse generators 70 and 70'. The output from the summing amplifier 76 and the differencing amplifier 78 are integrated by low frequency filters and DC amplifiers 80 and 82, respectively. The output of the low pass filter and DC amplifier 80 maybe delivered to an ammeter which provides an output indication representative of the combined rates of occurrence of pulses from the zero-crossing detector 66 and 66' which in turn is representative of the sum of the doppler frequencies received at antenna units 18 and 22. As will be apparent below, this signal is representative of the velocity of the vehicle and is compensated for changes in the pitch attitude of the vehicle.

The calibration oscillator 85 is connectable to the amplifiers 62 and 62' by calibration switches 68 and 68', respectively. The calibration oscillator 85 provides a reference frequency, for example, 2,000 hertz which represents a particular speed to which the output meter 84 is adjusted when the calibration oscillator 85 is connected to the zero-crossing detectors 66 and 66'.

As will also be apparent below, the signal from low pass filter and DC amplifier 82 is representative of the angle of pitch of the vehicle.

With regard now to the operation of the system 10, the frequency of the doppler shift Fd may be given as:

$$Fd = 2v/\lambda \cos \theta$$

where $v$ is the vehicle velocity, $\lambda$ is the wavelength of the radiated signal and $\theta$ is the angle between the axis of transmission/reception and the traveling surface. Similarly, the total number of cycles C of doppler shifted in any distance $d$ is given by:

$$C = 2d/\lambda \cos \theta$$

For example, utilizing a radiated signal of 18 gigahertz and an angle $\theta$ of 45°, Fd equals 37.5 Hz for each mile per hour of vehicle speed, and $C$ is equal to approximately 137,000 counts per mile.

Considering now the system 10 using a pair of antenna units, i.e., a forwardly directed antenna unit 18 and a rearwardly directed antenna unit 22, and recalling that the angles of the two antenna units are initially adjusted so that their axes of transmission/reception form equal angles $\theta$ with the road surface when the vehicle longitudinal axis is parallel with the road surface, the tilt of the vehicle through some small angle $\Delta$ results in the addition of the angle $\Delta$ to the pointing angle of one antenna unit and a subtraction of the angle $\Delta$ from the pointing angle of the other antenna unit. By adding the output of the two systems at the summing amplifier 76, the following function is performed to yield a combined output at $Fc+$:

$$Fc+ = 2v/\lambda \cos(\theta + \Delta) + 2v/\lambda \cos(\theta - \Delta)$$

or:

$$Fc+ = 2v/\lambda [\cos\sin\Delta + \cos\Delta - \sin\theta + \cos\theta\cos\Delta + \sin\theta\sin\Delta]$$

and $$Fc+ = 2v/\lambda [(2\cos\theta)\cos\Delta]$$

Since cosine $\Delta$ is approximately unity for small angles, it is clear from the above equation that the effect of small changes in the angle of the vehicle longitudinal axis is greatly reduced when the output of the two antenna units 18 and 22 are added.

In the subtraction of the two outputs at the differencing amplifier 78, the following operation occurs:

$$Fc- = 2v/\lambda \cos(\theta + \Delta) - 2v/\lambda \cos(\theta - \Delta)$$

and $$Fc- = 2v/\lambda [2 \cox\theta) \sin\Delta]$$

It can be seen that Equation 4 can be readily solved for sine $\Delta$. Since sine $\Delta$ is approximately equal to $\Delta$ small angles, a measurement of it is readily obtained through the subtraction process.

The above system may be readily adapted for measuring the lateral drift of a vehicle by arranging a pair of laterally divergent antenna units like the antenna units 18 and 22 as previously described so that both of the antennas are forwardly directed with the axis of transmission/reception of each of the antenna units forming a quint angle $\phi$ with the longitudinal axis, as illustrated by laterally divergent centerlines 92 and 94 in FIG. 2. Also each of the antenna units are downwardly inclined so that the axis of transmission/reception of each of the antenna units form an angle $\theta$ with the traveling surface.

The drift indicating system may include a drift signal processor which is duplicative of the system of FIG. 6 with one of the antenna units connected to one of the processing chanels and the other of the antenna units connected to the other of the processing chanels. In the drift signal processor the output is representative of the difference in the pulse content of the two doppler signal processing channels A and B from the low-pass filter and DC amplifiers may be used. The combined difference may be expressed by:

$$Fcd = 2v/\lambda (\cos\theta)(\cos\phi)\sin\delta$$

where $\theta$ is the angle between the axis of transmission/reception of each of the antennas with respect to the roadway, $\phi$ is the angle between the axis of transmission/reception of each of the antenna units with the longitudinal axis of the vehicle and $\delta$ is the angle of drift of the vehicle, also as illustrated in FIG. 2. If desired, the signal representative of the sum of the doppler signals from the antenna units may be used and the angle $\delta$ may be determined from the following relationship:

$$Fcs = 2v/\lambda (\cos\theta)(\cos\phi)\cos\delta$$

While it will be apparent that the teachings herein are well calculated to each one skilled in the art the method of making preferred embodiments of this invention, it will be appreciated that the invention is susceptible to modification, variation and change without departing from the proper scope of meaning of the subjoined claims.

I claim:

1. In combination with a land vehicle traveling along a roadway for the vehicle, a system comprising:

first generating and doppler detecting means including a diode for generating first high frequency electromagnetic energy and for providing a first doppler signal representative of the difference in frequencies between a returned part of said first high frequency energy and a generated part of said first high frequency energy;

first directing and receiving means including a first horn structure cooperative with said first generating and doppler detecting means for directing at least a portion of said first high frequency energy along a first axis intersecting said roadway and receiving along said first axis a returned part of said first high frequency energy directed along said first axis which is provided to said first generating and doppler detecting means, said first horn structure having an open end directed at said roadway with a first dielectric lens position in said opening and sealingly engaged therewith for protecting said first generating and doppler detecting means, said lens being spaced a predetermined distance from said roadway and having a focal length established in accordance with said distance for focusing said high frequency energy generally at said roadway so as to concentrate said high frequency energy into a restricted area at said roadway;

second generating and doppler detecting means including a second diode for generating second high frequency electromagnetic energy and for providing a second doppler signal representative of the difference in frequencies between a returned part of said second high frequency energy and a generated part of said second high frequency energy;

second directing and receiving means including a second horn structure cooperative with said second generating and doppler detecting means for directing at least a portion of said second high frequency energy along a second axis intersecting with said roadway and receiving along said second axis a returned part of said second high frequency energy directed along said second axis, said second axis having a predetermined divergence from said first axis, said second horn structure having an open end directed at said roadway with a second dielectric lens position in said opening and sealingly engaged therewith for protecting said second generating and doppler detecting means, said lens being spaced a predetermined distance from said roadway and having a focal length established in accordance with said distance for focusing said high frequency energy generally at said roadway so as to concentrate said high frequency energy into a restricted area at said roadway; and means for accomplishing one of a summation and subtraction of said first and second doppler signals for providing an output signal representative of the one of the sum and difference, respectively, of said first and second doppler signals whereby an operating condition of said vehicle is determinable from said output signal.

2. A system according to claim 1 wherein said first and second doppler signals are summed to provide said output signal.

3. A system according to claim 1 wherein said first and second doppler signals are subtracted to provide said output signal.

4. A system according to claim 1 wherein said first axis is generally forwardly directed with respect to the travel of said land vahicle along vehicle roadway and said second axis is generally rearwardly directed with respect to the travel of said land vehicle along said roadway.

5. A system according to claim 4 wherein said land vehicle has a longitudinal axis and wherein said first and second axes are substantially aligned with said longitudinal axis of said land vehicle.

6. A system according to claim 4 wherein said land vehicle is adapted for changes in pitch and wherein said first and second doppler signals are summed for providing said output signal whereby said output signal is related to the velocity of said land vehicle along said roadway and is compensated for changes in the pitch of said land vehicle.

7. A system according to claim 6 wherein said land vehicle has a longitudinal axis and wherein said first and second axes are substantially aligned with said longitudinal axis of said land vehicle.

8. A system according to claim 1 wherein said first and second axes are laterally divergent whereby said output signal is representative of lateral drift of said land vehicle.

9. A system according to claim 1 wherein said means for accomplishing one of a summation and subtraction of said first and second doppler signals comprises:

first converting means for converting said first doppler signal into a pulse train having a repetition rate representative of the frequency of said first doppler signal;

second converting means for converting said second doppler signal into a pulse train having a repetition rate representative of the frequency of said second doppler signal; and means for accomplishing one of a summation and subtraction of said first and second pulses for providing said output signal.

10. A system according to claim 9 wherein each of said lenses has a second focal length established to be generally the distance between said lens and said respective generating and doppler detecting means.

11. A system according to claim 1 wherein each of said horns diverges towards said opening and each further includes an opposite opening communicating with said respective generating and doppler detecting means.

12. A system according to claim 1 wherein each of said lenses includes a first lens portion for focusing said high frequency energy at said roadway and a second lens portion for focusing received high frequency energy generally in the vicinity of said respective generating and doppler detecting means.

* * * * *

UNITED STATES PATENT OFFICE
CERTIFICATE OF CORRECTION

Patent No. 3,833,906    Dated September 3, 1974

Inventor(s) Carroll F. Augustine

It is certified that error appears in the above-identified patent and that said Letters Patent are hereby corrected as shown below:

Abstract, line 4, "downardly" should be --downwardly--. Column 5, line 37, "[2 cox" should be --[(2 cos--. Column 5, line 57, "chanels" should be --channels--. Column 5, line 58, "chanels" should be --channels--. Column 7, line 22, "vahicle along vehicle roadway" should be --vehicle along said roadway--.

Signed and sealed this 24th day of December 1974.

(SEAL)
Attest:

McCOY M. GIBSON JR.
Attesting Officer

C. MARSHALL DANN
Commissioner of Patents